UNITED STATES PATENT OFFICE.

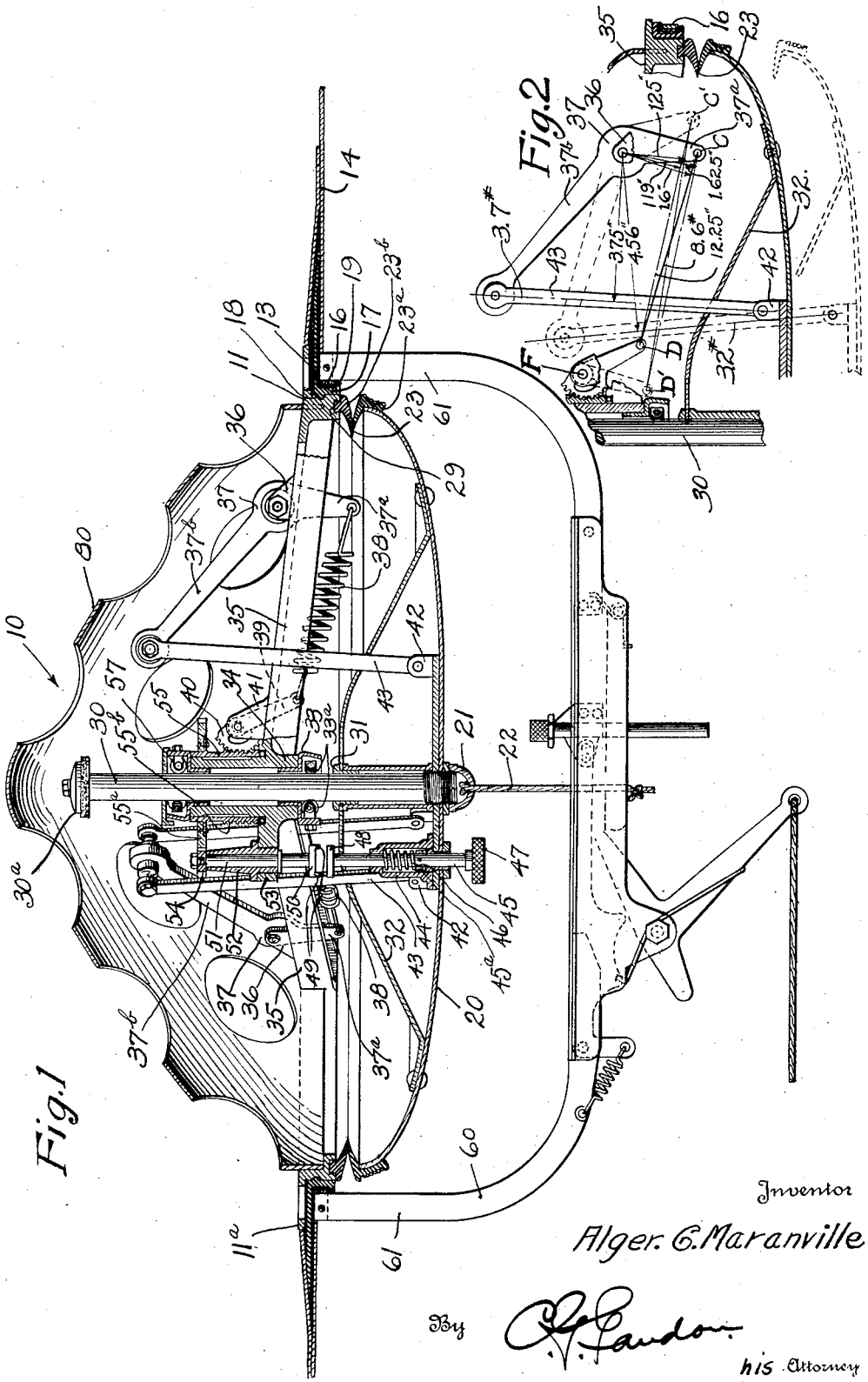

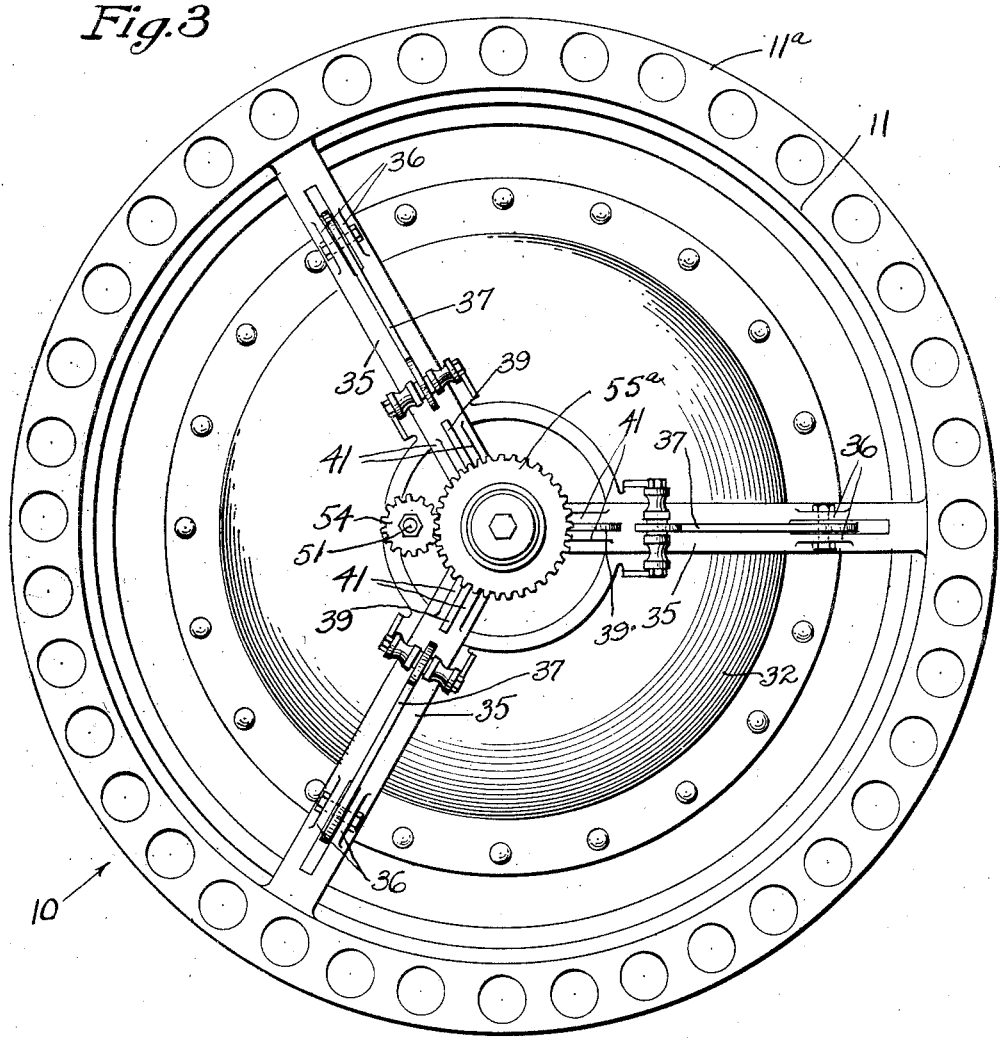

ALGER G. MARANVILLE, OF AKRON, OHIO, ASSIGNOR TO THE GOODYEAR TIRE & RUBBER COMPANY, OF AKRON, OHIO, A CORPORATION OF OHIO.

AUTOMATIC GAS-VALVE.

1,384,268.  Specification of Letters Patent.  Patented July 12, 1921.

Application filed October 16, 1919. Serial No. 331,197.

*To all whom it may concern:*

Be it known that I, ALGER G. MARANVILLE, a citizen of the United States, and resident of Akron, Ohio, have invented new and useful Improvements in Automatic Gas-Valves, of which the following is a specification.

My invention relates to a gas valve and has particular reference to an automatic valve of the type used on balloons or air ballonnets associated therewith.

It is an object of my invention to provide a valve of the type mentioned which shall be sensitive and dependable in operation and which shall open at once to substantially maximum position when the predetermined degree of pressure difference shall have been attained and will quickly close when the equilibrium of pressure difference has been reëstablished.

It is a further object of my invention to provide an improved means for adjusting the load on the valve which tends to close the same.

Other objects and advantages will appear as the description proceeds, and the invention will be more particularly defined in the claims hereto appended.

In the drawings, wherein I have illustrated a preferred form of my invention:

Figure 1 is a vertical section of an automatic gas valve of the disk type, secured in place in the balloon envelop;

Fig. 2 is a similar view somewhat diagrammatic in its character, and with parts removed, indicating the elements in different position and showing the moments of forces; and Fig. 3 is a plan view of said valve.

Referring to Fig. 1, the numeral 10 designates, as a whole, the automobile valve, which is the subject of my invention, as used on balloons or air ballonnets, or the like for maintaining an equilibrium of pressure difference by compensating for any variations in atmospheric pressure, such variations being caused by change in altitude, temperature, and other atmospheric conditions.

This valve 10 comprises a metal annulus 11 having an outwardly turned perforated flange 11ª, the body of the annulus being fitted into a circular opening formed by a ring shaped gasket 13, preferably of rubber-impregnated fabric. Said annulus 11 is secured to said gasket 13, and within a circular aperture of the balloon envelop 14, by a split band forming a clamping ring 16 which encircles flange 17 on the gasket 13 and binds the gasket to the annulus 11, the split edges of the balloon fabric 14 being secured to the gasket 13 by cementing or otherwise. The flange 17 of the gasket 13 has a bead 18 on its inner surface which conforms to and fits within a recess in the annulus, and it has also a bead 19 on its outer surface to prevent the clamping ring or band 16 from slipping off. This gasket 13 is especially adapted for setting a valve like 10 in a balloon envelop or the like, so that not only is a tight joint secured, but the valve may be readily and quickly inserted in place and removed, as is more fully described and set forth in my copending application Ser. No. 331,198 of even date, of which it forms the subject matter.

One of the principal parts of the valve is the disk-like dome 20, which is concavo-convex in form and is provided at its center with a lug 21 or the like, to which a cord or metallic cable 22 may be fastened by making a knot in the end thereof, as shown, the cable being part of a manual operating mechanism. A cable has been found to be efficacious in preventing charges of static electricity being stored in either the valve or the yoke carrying the manual operating mechanism. The manual operating mechanism is preferably carried by a yoke or frame 60 having legs 61 which are screwed or otherwise secured to the clamping ring 16. The details of the manual operating mechanism are not a feature of the invention claimed herein, but the device is more particularly described in my copending application Ser. No. 331,200 of even date, of which it forms the subject matter.

To the outer edge of the dome 20 is secured one section 23ª of the gasket 23, which gasket forms the subject matter of my copending application Ser. No. 331,199 of even date. Coöperating with the part or section 23ª of the gasket is a second part of section 23ᵇ which is secured to the annulus 11 by being provided with a rib 29, wedge or key-stone shaped in cross-section, which fits into a similarly shaped groove on the annulus 11.

Normally the valve 10 is automatically operated by difference in pressure between that inside the gas envelop or air ballonnet and that of the atmosphere, whereby the valve is opened for the relief of pressure inside the envelop and closed when pressure equilibrium is reëstablished. The mechanism for effecting this operation consists of the dome 20, carried by the annulus 11, and exposed to atmospheric pressure on one side, and to that inside the envelop on the other. This dome has secured to the central portion thereof and opposite the lug 21 a stem 30 which is supported or reinforced by any suitable means such as a collar 31 carried by a concaved plate or disk 32, secured to the dome, which gives the device greater rigidity. The stem 30 is provided at its end with a suitable stop $30^a$ and passes through a central frictionless bearing 33, and a similar bearing 57. The bearing 33 is preferably composed of three rolls $33^a$ and is supported by a hub 34 formed at the meeting point of three spider arms 35, which are radially arranged and fixed to the inner surface of the annulus 11, and project inwardly to the center. A pair of ears 36 is formed integral with each spider arm 35, near the outer end thereof, and between the ears of each pair is pivoted a bell-crank lever 37. Helical contractile springs 38 are respectively secured at one end to the shorter and slightly curved end $37^a$ of the bell-cranks 37, and the other ends of the springs 38 are fastened to arms 39 of toothed sectors 40 pivoted between other ears 41 carried by the spider arms 35 at their inner ends and near the hub 34. The long ends $37^b$ of the bell-cranks 37 are connected to lugs 42 on the dome 20, and near the center thereof by means of links 43. It will thus be seen that the springs 38 tend to move the valve toward closed position by pulling the dome 20 toward the gas envelop, bringing just the lip portions of the gasket sections $23^a$ and $23^b$ into contact to shut off the outflow of gas. The tension of the springs 38 is determined so that the pressure will normally hold the lips only of the gaskets together, whereby upon the slightest increase of pressure difference the valve will suddenly open wide.

In order that the valve may open quickly to substantially its maximum opening, thereby reëstablishing equilibrium of pressure difference in the shortest time possible, I have provided a valve loading mechanism which will operate with decreasing resistance. This feature is furthermore desirable, since the volume of air or gas is variable, and the maintenance of constant pressure difference is the essential desideratum. In other words, even though the gas or air volume in the enevolp may have diminished, the valve must still operate at the same difference of pressure between that inside and that outside.

By way of further illustration of this feature, reference is made to Fig. 2, which shows in full lines the position of the elements when the valve is closed, and in dotted lines when the valve is open, parts being omitted, for the sake of clearness: the figures represent the forces in pounds (#) and the lengths of the lever arms in inches (").

If the pressure difference on the two sides of the valve be assumed to be 1 inch (referred to water) then a total force of about 11.1 pounds must be applied to resist such pressure. This force will be equally distributed among the three sets of levers and springs, secured respectively to the three spider arms 35; hence, each set must supply a force of 3.7 pounds which force is obtained by the use of a spring of 8.6 pounds tension, calculated by moments as follows, the figures representing the lengths of the lever arms being assumed for purpose of illustration only:

(1). Pressure on dome $\times$ lever arm$=$
spring tension $\times$ its lever arm or $3.7 \times 3.75 = 1.6 \times$ spring tension;

hence,

Spring tension$=8.6$ pounds.

If one inch be the desired normal pressure difference, the tension of the spring is adjusted so that with such a difference, the gasket lips will be held in the position shown in Figs. 1 and 2. When this difference is exceeded, the valve will open.

As stated, the valve opens with a decreasing tension, that is, the point C has started to move to C', and with the elongation of the spring caused by such movement, its tension has increased from 8.6 pounds to 12.25 pounds, but the pressure on the dome has decreased as will be seen, for by substituting in equation (1):

Pressure on dome $\times 4.56 = 12.25 \times 1.9$;

or,

Pressure on dome$=3.2$.

That is to say, the pressure on the dome has decreased .5 pound from the closed position of the valve to the open, and the total decrease is $3 \times .5$, or 1.5 pounds between closing and opening.

I have also provided mechanism for suitably adjusting the tension of the springs 38, and this mechanism consists of a cylinder 44 bolted or otherwise secured to the inside of the dome 20 near the center. Passing through the cylinder and dome is a plunger-like element or rod 45, normally thrust outward by means of an expansion spring 46, one end of which bears against the inner end of the cylinder and the other against a collar $45^a$ secured to the rod 45. The outer end of the rod 45 has a knurled head 47 or the like, to facilitate turning the rod with the fingers. The inner end of the rod 45 has a cross-head 48, which is adapted to fit between the forks 49 of a similar cross-head 50 carried at the end of a shaft 51, which is mounted for rotation in a bushing 52 of a bracket 53, the bracket 53 being supported by the hub 34 where the spider arms 35 meet. A pinion 54 is secured to the other end of the shaft 51 and meshes with a gear 55ª formed at the end of a sleeve 55 arranged for rotation abut the hub 34. The sleeve 55 is exteriorly screw-threaded at 55ᵇ and the threads are engaged by the teeth of the sector 40, so as to constitute an arrangement similar to a worm and gear device. It will be apparent, that if it be desired to adjust the tension of the spring 38, one may press in the rod 45 against the tension of the spring 46 until the cross-head 48 comes between the forks 49 and upon turning the rod 45 the pinion 54 will turn the sleeve 55 and the sectors 40 will be rocked on their respective pivots, moving the arms 39 of the sectors so as to elongate or shorten the spring 38 and change the moment arms thereof, thereby increasing or decreasing the tension thereof.

Referring again to Fig. 2, and assuming that it be desired to have the valve operate on a 3 inch pressure difference instead of 1 inch difference, as assumed in the above example, the effective lever arms would remain the same, but the decreasing valve pressure instead of being 1.5 pounds would be 9.4 pounds if the springs 38 were elongated along the lines of their respective axes, and if no provision were made to compensate for this undesirable decrease. In the mechanism disclosed, however, such compensation is provided for. The lever 39 is moved from the position F D to F D', which not only increases the spring tension, but also increases the effective lever arm of the spring from 1.6 inches to 1.625 inches in the closed position, and from 1.19 inches to 1.25 inches in open position, as shown in Fig. 2, thus compensating for the great decrease which would occur if the point D were simply moved back in alinement with the axis of the spring.

I have, as stated, also provided anti-friction rollers or bearings 57 above the gear 55ª which, together with the similar bearings 33ª, will aid in allowing practically frictionless movement of the stem 30, and will, furthermore, prevent any binding of the stem 30 in the bearing by transverse wind pressure on the dome surface, a very important feature.

A guard 80 consisting of a conoidal casing, perforated to reduce weight, has been provided to protect the valve mechanism 10, and is secured to the annulus 11 by means of screws, so as to inclose the valve 10.

In order to reduce the weight of the structure the parts are, in so far as possible, made of aluminum, except those particularly specified, thus providing a valve of about two-thirds the weight of those formerly in use.

The operation of the valve may be summarized as follows:

The tensions of the springs 38 are first adjusted, by means of the elements 45, 46, 51, 55, 39 and 40, as described above, so that the lips 23ª and 23ᵇ will be held apart at their outer edges when the dome is exposed to the predetermined pressure difference, and the inner edges or lip portions alone will be in contact. The instant the normal difference in pressure is exceeded, for example by decrease of the pressure of the atmosphere outside the valve, the lips will spring apart, and the valve will open quickly to substantially its maximum opening, by reason of the fact that the farther it opens, the less will be the pressure required to move it to overcome the spring tension, with the result that a large volume of air or gas will be discharged quickly to reëstablish the equilibrium. When this equilibrium has been restored, the valve will likewise close quickly, bringing the inner lip edges only of the gasket 23 into contact again.

While I have shown but a single embodiment of my invention, it will be understood that changes and modifications, not inconsistent with the appended claims, may be made without in any degree departing from the essence of my invention.

What I claim is:

1. In an apparatus for controlling the flow of fluid, a valve seat, and an automatically operating valve adapted to open under fluid pressure and with decreasing resistance to said pressure.

2. In an apparatus for controlling the flow of fluid, a valve seat, and an automatically operating valve of the disk type adapted to open under fluid pressure and with decreasing resistance to said pressure.

3. In an apparatus for controlling the flow of fluid, a valve seat, and an automatically operating valve adapted to open in the direction of the flow of the fluid under the pressure of said fluid and with decreasing resistance to said pressure.

4. In an apparatus of the character described, fluid controlling elements comprising a valve seat, an automatic fluid operated valve, a spring normally urging said valve toward said seat, a lever pivoted between the ends thereof, to provide two arms, one of said arms being connected to said spring and the other to said valve, whereby said valve opens with decreasing resistance.

5. In an apparatus of the character described, fluid controlling elements comprising a valve seat, an automatic fluid operated valve, a spring anterior to said valve and normally urging said valve toward said seat, a link connected to said valve, and a lever pivoted between the ends thereof to provide two arms, one of said arms being connected to said spring, and the other to said link.

6. In an apparatus of the character described, fluid controlling elements comprising an annular valve seat, an automatic fluid operated valve of disk-type, a spring anterior to said valve and normally urging said valve toward said seat, said spring being radially arranged with respect to said valve, a link connected to said valve, and a lever pivoted between the ends thereof, to provide two arms, one of said arms being connected to said spring and the other to said link.

7. In an apparatus of the character described, fluid controlled elements comprising a valve seat, an automatic fluid operated valve of disk type, a plurality of springs anterior to and connected to said valve and normally urging said valve to said seat, said valve opening in the direction of fluid flow, and with decreasing resistance.

8. In an apparatus of the character described, fluid controlled elements comprising a valve seat, an automatic fluid operated valve of disk type, a plurality of springs anterior to and connected to said valve and normally urging said valve to said seat, said valve opening in the direction of fluid flow, and with decreasing resistance, and means posterior to said valve for adjusting the tension of said springs.

9. In an apparatus of the character described, an aeriform fluid-containing receptacle having an opening, a valve controlling the flow of fluid through said opening, said valve comprising an element exposed on one side to the pressure within said receptacle and on the other side to atmospheric pressure, means for controlling the operation of the valve, said means being adapted to effect a decreasing resistance to a predetermined pressure within the receptacle during the opening operation.

10. In an apparatus for controlling the flow of fluid, a valve seat, an automatically operating valve adapted to open under fluid pressure with decreasing resistance to said pressure, and means for regulating the valve to open under different pressures.

11. In an apparatus for controlling the flow of fluid, a valve seat, an automatically operating valve adapted to open in the direction of the flow of the fluid under the pressure of said fluid and with decreasing resistance to the pressure thereof, and means for regulating the valve to open under different pressures.

12. In an apparatus of the character described, an aeriform fluid-containing receptacle having an opening therein, a valve seat secured within said opening, an automatic fluid operated valve, coöperating with said seat, spring means for closing said valve, means for adjusting the tension of said spring means, and means operable from outside said valve and fluid receptacle and normally out of engagement with said adjusting means, adapted to be brought into engagement with said adjusting means to operate the same.

13. In an apparatus of the character described, an aeriform fluid-containing receptacle, an opening therein, a valve controlling the flow of fluid through said opening, a spring for closing said valve, means for adjusting the tension of said spring, a plunger, a second spring normally holding said plunger out of engagement with said adjusting means, the end of said plunger being accessible outside said valve and receptacle, whereby said plunger can be brought into engagement with said adjusting means to operate the same.

14. In an apparatus of the character described, an aeriform fluid-containing receptacle, an opening therein, a valve controlling the flow of fluid through said opening, a spring for closing said valve, means for adjusting the tension of said spring, said adjusting means comprising a forked element, a plunger having a cross-head at its innermost end, a spring normally holding said plunger out of engagement with said adjusting means, and means for operating said plunger to bring said cross-head between said forks.

15. In an apparatus of the character described, an aeriform fluid-containing receptacle, an opening therein, a valve controlling the flow of fluid through said opening, a spring for closing said valve, means for adjusting the tension of said spring, said adjusting means comprising a pivoted element for simultaneously elongating said spring and changing the angle thereof.

16. In an apparatus of the character described, an aeriform fluid-containing receptacle, an opening therein, a valve controlling the flow of fluid through said opening, a spring for closing said valve, means for adjusting the tension of said spring, said adjusting means comprising a pivoted arm connected to said spring, means exterior said valve for operating said arm to simultaneously elongate said spring and shift the plane thereof.

17. In a valve the combination with a valve seat and a valve adapted to open under fluid pressure, of valve seating mechanism comprising a lever arm mounted intermediate its ends to fulcrum upon the seat, means pivotally connecting one end of the arm to the valve for movement therewith, a retractile spring having its ends connected respectively to the valve seat and the free end of the arm, the arm fulcrum and the spring end connections being relatively arranged to provide for movement of the spring connected end of the arm toward a dead center with said fulcrum intermediate said spring ends whereby the leverage of said arm is increased over the pull of the spring and the valve is opened with decreasing resistance to said pressure.

18. In a valve the combination with a valve seat and a valve adapted to open under fluid pressure, of valve seating mechanism comprising a lever arm mounted intermediate its ends to fulcrum upon the seat to provide a long arm and a short arm, means pivotally connecting the end of the long arm to the valve for movement therewith, a retractile spring having its ends connected respectively to the valve seat and the end of the short arm, the arm fulcrum and the spring end connections being relatively arranged to provide for movement of the spring connected end of the short arm toward a dead center with said fulcrum intermediate said spring ends whereby the leverage of said arm is increased over the pull of the spring and the valve is opened with decreasing resistance to said pressure.

19. In a valve the combination with a valve seat and a valve adapted to open under fluid pressure, of valve seating mechanism comprising a lever arm mounted intermediate its ends to fulcrum upon the seat, means pivotally connecting one end of the arm to the valve for movement therewith, a segment pivotally mounted upon the seat, a retractile spring having its ends connected respectively to the segment and the free end of the arm, the arm fulcrum and the spring end connections being relatively arranged to provide for movement of the spring connected end of the arm toward a dead center with said fulcrum intermediate said spring ends whereby the leverage of the arm is increased over the pull of the spring to permit opening movement of the valve with decreasing resistance to said pressure, and means for rocking the segment to adjust the spring tension, said means being operable exteriorly of the valve.

20. In a valve the combination with a valve seat and a valve guided for movement axially thereof to open under fluid pressure, a valve seating mechanism comprising a lever arm mounted intermediate its ends to fulcrum upon the seat, means pivotally connecting one end of the arm to the valve for movement therewith, a segment pivotally mounted upon the seat, a retractile spring having its ends connected respectively to the segment and the free end of the arm, the arm fulcrum and the spring end connections being relatively arranged to provide for movement of the spring connected end of the arm toward a dead center with said fulcrum intermediate the spring ends whereby the leverage of the arm is increased over the pull of the spring to permit opening movement of the valve with decreasing resistance to said pressure, and means adapted to rock the segment to tension the spring, said means comprising a threaded sleeve mounted for rotational movement about the valve axis and operable from the exterior of the valve.

21. In a valve the combination with a valve seat and a valve adapted to open under fluid pressure, of valve seating mechanisms comprising a lever arm mounted intermediate its ends to fulcrum upon the seat, said lever being provided with a long arm and a short arm disposed in angular relation, means pivotally connecting the end of the long arm to the valve for movement therewith, a retractile spring having its ends connected respectively to the seat and the short arm of the lever, the arm fulcrum and the spring end connections being relatively arranged to provide for movement of the spring connected end of the short arm toward a dead center with said fulcrum intermediate said spring ends whereby the leverage of the arm is increased over the pull of the spring and the valve is opened with decreasing resistance to said pressure.

In witness whereof, I have hereunto signed my name in the presence of two subscribing witnesses.

ALGER G. MARANVILLE.

Witnesses:
J. E. KEATING,
PHILIP E. BARNES.